March 12, 1935. F. G. FOLBERTH ET AL 1,994,244
AUTOMOTIVE VEHICLE CONTROL MECHANISM
Filed April 20, 1932    2 Sheets-Sheet 1
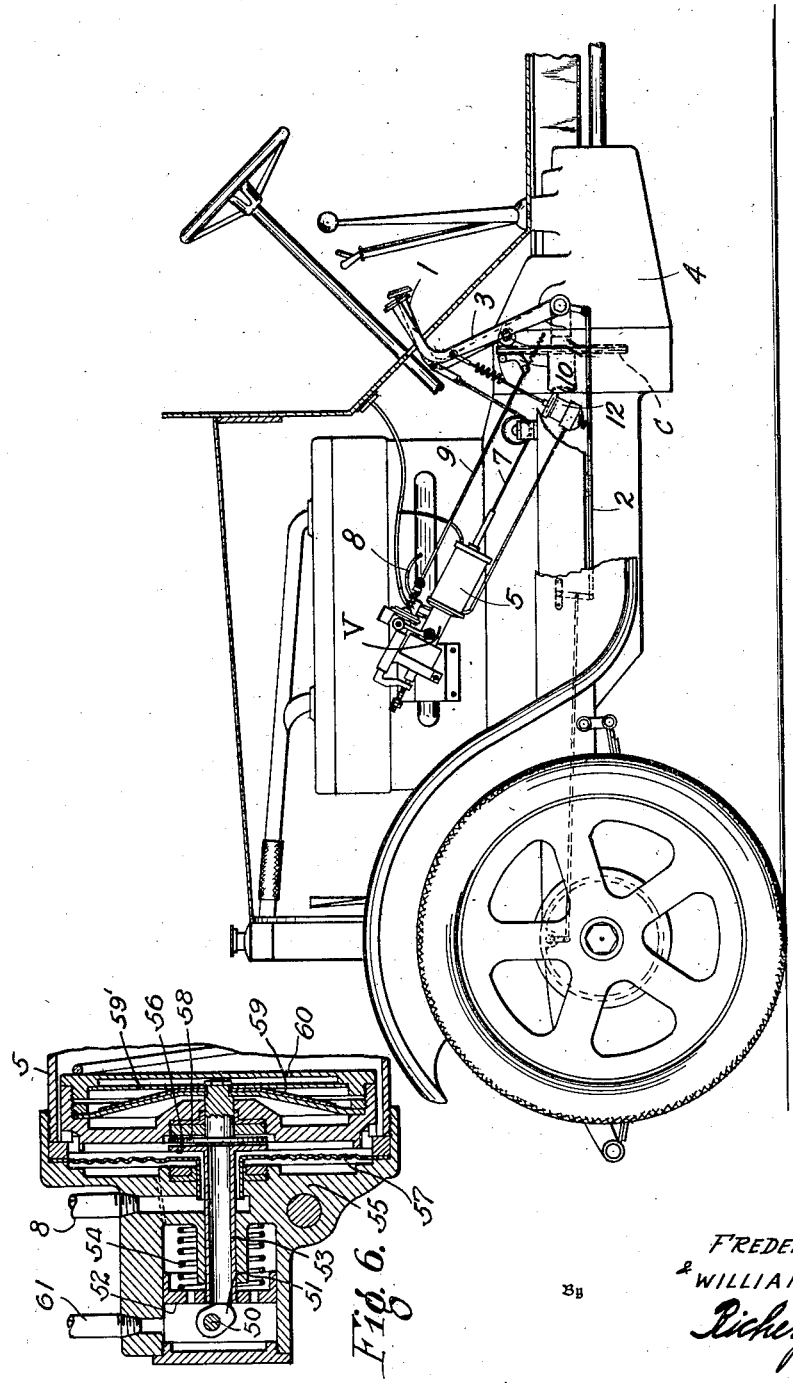
Inventors
FREDERICK G. FOLBERTH
& WILLIAM M. FOLBERTH
Richey & Watts
Attorneys

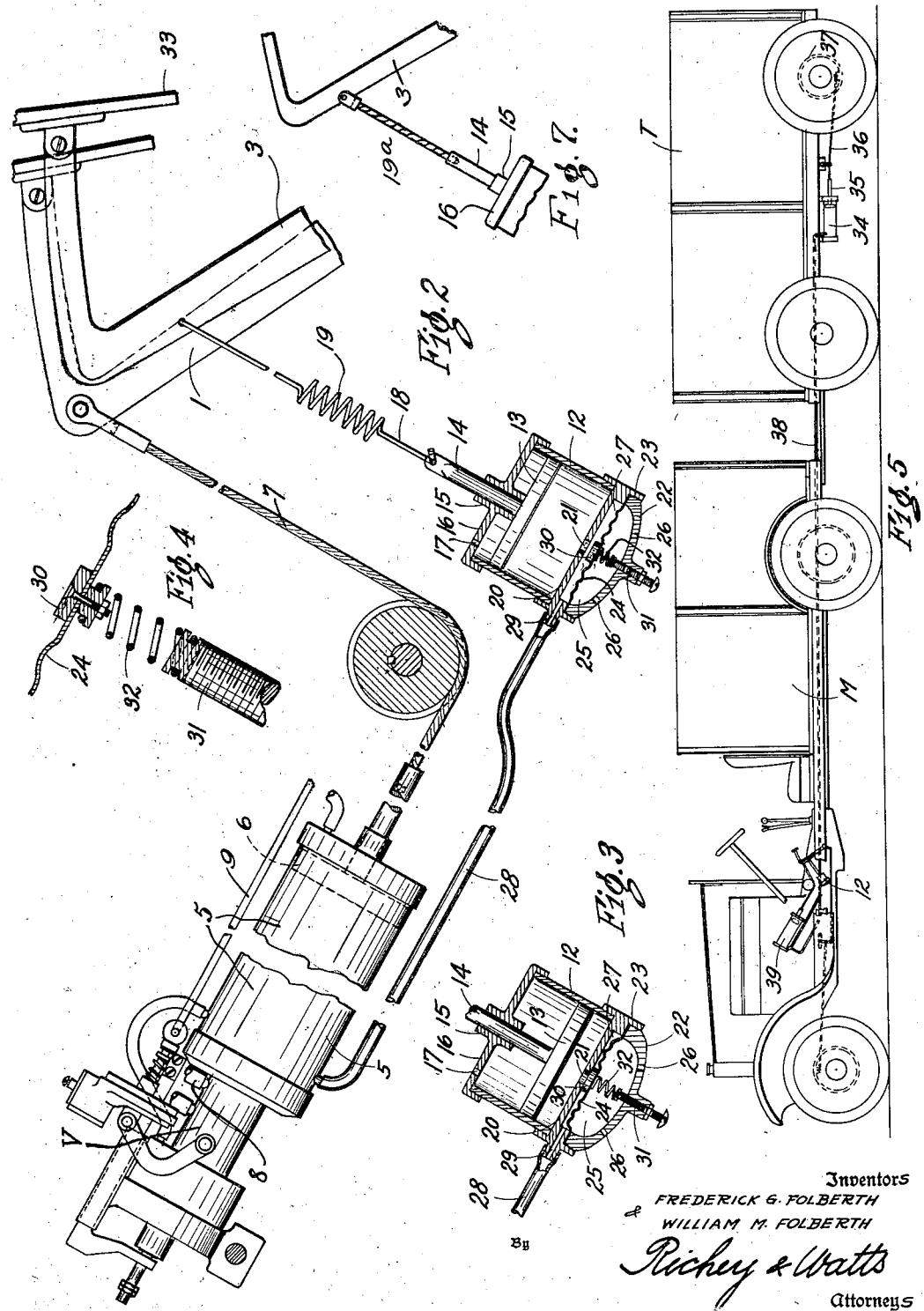

Patented Mar. 12, 1935

1,994,244

UNITED STATES PATENT OFFICE 1,994,244

AUTOMOTIVE VEHICLE CONTROL MECHANISM

Frederick G. Folberth and William M. Folberth, Cleveland, Ohio

Application April 20, 1932, Serial No. 606,432

6 Claims. (Cl. 192—13)

This invention relates to fluid pressure actuated devices and more particularly to fluid pressure actuated control mechanism for automotive vehicles.

In our co-pending United States applications, Serial No. 483,328, filed September 20, 1930, Serial No. 533,076, filed April 27, 1931 and Serial No. 585,818, filed January 11, 1932, we have described and claimed a fluid pressure operated apparatus for actuating the brakes of a motor vehicle. In the type of apparatus disclosed in these applications movement of the vehicle clutch pedal is adapted to operate the mechanism which controls the actuation of the vehicle brakes.

The present invention contemplates combining other fluid pressure actuated apparatus which further facilitate the operation of a motor vehicle with a fluid pressure actuated brake hook-up of the type disclosed in our above noted co-pending applications.

It is among the objects of our invention to provide automotive vehicle control mechanism by virtue of which the effort required on the part of the driver to operate both the vehicle clutch and the vehicle brake is reduced to a minimum. Other objects of our invention are: the provision of a fluid pressure actuated vehicle brake operating device and a fluid pressure actuated mechanism adapted to reduce the effort necessary to disengage the vehicle clutch together with means for combining the action of the two above noted fluid pressure actuated devices whereby an extremely simple and efficient vehicle control system is secured; the provision of vehicle clutch and brake actuating mechanism which may be readily installed on automobiles of standard construction and which is particularly susceptible to easy upkeep and trouble-free operation; the provision of vehicle control apparatus which is particularly adapted for use on motor trucks, busses and truck and trailer trains; the provision, in a clutch lever controlled, fluid pressure actuated vehicle brake operating mechanism, of fluid pressure actuated mechanism for relieving the operator of the vehicle of the necessity of overcoming the clutch springs during the brake controlling movement of the clutch lever; the provision of fluid pressure actuated mechanism adapted to exert a disengaging force on the clutch operating lever of a motor vehicle having fluid pressure actuated brakes when the fluid pressure is utilized to apply the vehicle brakes.

The above and other objects of our invention will appear from the following description of a preferred form thereof, reference being had to the accompanying drawings, in which—

Figure 1 is a side elevation partly in section of the forward portion of a motor vehicle illustrating our improved control apparatus installed.

Figure 2 is an enlarged detached illustrative view of our control apparatus together with the vehicle clutch and brake operating levers.

Figure 3 is a sectional view of the clutch actuating cylinder mechanism illustrated in Figure 2 but showing the fluid pressure control valve in its closed position.

Figure 4 is an enlarged fragmentary view illustrating the spring which controls the clutch cylinder valve.

Figure 5 is a side elevation illustrating the application of our vehicle control apparatus to a truck and trailer train.

Figure 6 is a vertical cross sectional view of a form of control valve adapted to give the proper control of the operation of the vehicle brakes.

Figure 7 is a fragmentary view of a portion of the apparatus shown in Figure 2 and illustrating a modified form thereof.

In the motor vehicle illustrated in Figure 1 the brake operating lever 1 may be connected to operate the vehicle brakes in any suitable manner as through the brake rod connections 2. The clutch operating lever 3 is mounted on the vehicle transmission housing 4 and may be connected to operate the vehicle clutch C in any desired manner. The brake and clutch lever arrangement is the usual one employed in present day automotive vehicles and when the brake lever 1 and the clutch lever 3 are in the positions indicated in Figure 1 it may be assumed that the vehicle brakes are off and the vehicle clutch C is engaged. A fluid pressure cylinder 5 carries a piston 6 which may be connected to any suitable means, such as the cable 7, to the brake lever 1. The left hand end (Fig. 2) of cylinder 5 is connected to the intake manifold of the vehicle engine by a pipe or tube 8 and valve mechanism generally indicated at V is adapted to control the flow of actuating fluid to and from the cylinder 5, thus controlling the operation of the vehicle brakes. The control valve V and its accessories are shown in detail in Figure 6 but are only rather briefly described later in this specification as they are generally similar to the type of control valve illustrated in our above noted co-pending United States patent applications. Furthermore, it will be understood that other types of control valves adapted to give the proper braking action and control may be used and that the control valve per se does not form any part of the present invention.

Secured to and extending downwardly from the valve V is a valve operating rod 9 which is pivotally attached at its lower end to the cam member 10 mounted on the transmission or clutch housing of the vehicle. The cam 10 is adapted to be engaged by a roller 11 secured to the clutch lever 3. It will be noted that when the clutch is in engaged position, as shown in Figure 1, the roller 11 is removed from the cam 10. The initial downward movement of the clutch lever 3 will serve to disengage the clutch and the parts are preferably so adjusted that the roller 11 will not strike the cam 10 until the clutch is completely disengaged. Thus, the valve V will not be opened to connect the cylinder 5 to the reduced pressure in the intake manifold of the engine and cause application of the brakes until after the clutch has been disengaged.

The brake actuating apparatus thus far described is generally similar to that described in our co-pending United States patent applications, above noted.

In order to facilitate the disengagement of the vehicle clutch we have provided a second fluid pressure cylinder 12 which carries a piston 13 reciprocally supported therein. Secured to the piston 13 is a piston rod 14 which extends out through a suitable bearing 15 in the end cap 16 of the cylinder 12. An aperture 17 in the end cap 16 establishes constant communication between the piston rod end of the piston 13 and the atmosphere.

The outer end of the piston rod 14 is connected to the clutch lever 3. In the apparatus illustrated this connection is made through a wire 18 and includes a spiral spring 19. It will be understood, however, that the piston rod 14 may be directly connected to the clutch lever 3 without the insertion of any resilient means such as the spring 19 in the connection between the piston 13 and the clutch lever 3. Such an arrangement is shown in Figure 7 in which a cable 19a connects the piston rod 14 to the clutch lever 3. At the lower end of the cylinder 12 is an end plate 20 provided with a central aperture 21. An end cap member 22 has threaded engagement with the upstanding flange 23 of the end plate 20 and a diaphragm 24 is clamped at its periphery between the end plate 20 and the end cap 22. This diaphragm 24 is adapted to divide the chamber formed between the end plate 20 and the end cap 22 into two portions or sub-chambers one of which, 25 is adapted to communicate with the atmosphere through apertures 26 in the end cap 22. The chamber 27 which lies on the opposite side of the diaphragm 24 from chamber 25, is adapted to communicate with the suction end of cylinder 5 of the brake operating mechanism through the conduit 28 and the passage 29.

The diaphragm 24 is preferably of flexible construction, such as a circumferentially corrugated metal plate, and carries at its center a closure member 30. An adjusting screw 31 extends through and has threaded engagement with the end cap 22. Interposed between the end of the adjusting screw 31 and the diaphragm 24 is a spring 32. This spring 32 has a swivel connection at one end to the adjusting member 31 and at its other end to the diaphragm 24 (see Fig. 4) and tends to normally maintain the closure member 30 away from the end plate 20 as is illustrated in Figure 2.

Referring now to Figure 6, the brake control valve which has been generally referred to by the reference character V is illustrated in detail. This valve is adapted to control the application of the operating fluid pressure in accordance with the degree of movement imparted to the operating lever. As the details of this valve do not form any part of the present invention and are described and claimed in our above noted co-pending application, and as any fluid pressure controlling valve which is adapted to give the desired brake action may be used with our apparatus, the specific valve construction will be briefly described here.

A cross shaft 50 is connected to be rotated by movement of the rod member 9. As the rod member 9 is adapted to be moved by the vehicle clutch pedal it will be seen that the brake valve control mechanism may be actuated by the vehicle driver through the clutch pedal. The cross shaft 50 carries a cam portion 51 and rotation of the shaft 50 causes the cam 51 to engage the enlarged guiding head 52 on the tubular valve stem 53. A compression spring 54 is disposed between the head 52 and the valve carrying casting 55 and tends to maintain the valve in its closed position. Movement of the valve stem 53 moves the valve closure member 56 and controls the withdrawal of air from the interior of the cylinder 5 through the pipe 8 which leads to the intake manifold of the vehicle engine.

When the shaft 50 is turned by movement of the rod 9 the valve closure member 56 will be moved away from its normal seated position upon the flexible diaphragm 57. During this movement the disc member 58 and the diaphragm 59 will also be moved in a direction away from the diaphragm 57. A spring disc member 59', preferably perforated, normally tends to maintain the seat 58 seated against the closure member 56. An inspection of Figure 6 will reveal that the parts are now in the position just described and a connection is established between the interior of the cylinder and the suction of the intake manifold. When the suction on the right hand side of the diaphragm 57 is sufficiently great to cause the atmospheric pressure on the opposite side of the diaphragm to overcome the resiliency of the diaphragm it will be moved to the right against the closure member 56 thus closing off the vacuum connection. By this means a gradual application of the brakes may be obtained and any given degree of application of the brakes maintained. When the closure member 56 is permitted to be moved to the left under the influence of the spring 54 after the pressure within the cylinder 5 has been reduced the diaphragm 59, which is enclosed in a casing which in turn has a relatively small hole 60, connecting it to the interior of the cylinder 5, will act to hold back the disc member 58 and thus the closure member 56 and the disc 58 will be separated thus completing a connection from the interior of the cylinder to the atmosphere through the tube 53 and the pipe 61.

It will be understood by those skilled in the art that other types of self lapping fluid pressure controlling valves may be used to control the action of the brakes and therefore we do not wish to be limited to the use of the specific brake control valve herein shown and described.

In operating a vehicle equipped with the apparatus described, the driver, when he wishes to apply the vehicle brakes, pushes downwardly with his foot upon the pedal 33 attached to the clutch lever 3. The initial downward movement of the lever 3 disengages the vehicle clutch and when the roller 11 strikes the cam 10 the control valve V will be moved to connect the intake manifold suction to the upper end of the cylinder 5. This will cause the piston 6 to move upwardly in the cylinder 5 and will exert a brake applying force upon the brake mechanism. As the conduit 28 connects the upper end of the cylinder 5 to the clutch operating cylinder 12, when the cylinder 5 is connected to the intake manifold suction, the interior of the cylinder 12 will also be connected to the same degree of suction through the conduit 28, the passage 29, the chamber 27 and the aperture 21. The reduction pressure within the cylinder 12 will cause the piston 13 to move downwardly therein thus exerting a force tending to maintain the clutch in its disengaged position. This force, tending to disengage the clutch, will, of course, be dependent upon the degree of vacuum which is established within the cylinder 12 and the strength of the spring 19. When the vacuum within the cylinder 12 reaches a desired predetermined value the atmospheric pressure within the chamber 25 will act upon the diaphragm 24 to move it upwardly against the tension spring 26 until the closure member 30 seats against the end plate 20 and closes the aperture 21. When this occurs the intake manifold suction will be closed off from the interior of the cylinder 12 and, even though the suction within the cylinder 5 be increased by further opening of the valve V, the suction within the cylinder 12 will remain constant.

The degree of suction within the cylinder 12 which will cause the diaphragm 24 to move and close the aperture 21 may be regulated by the adjusting screw 31 which is adapted to vary the tension of the spring 32. This screw 31 is preferably adjusted so that the spring 32 will permit the aperture 21 to be closed by the closure member 30 when a force, almost but not quite, great enough to overcome the clutch engaging springs is being exerted on the clutch lever 3 through the piston 13 and its operating connections. The size of the cylinder 12 is preferably such that the initial opening of the valve V will cause sufficient force to be exerted on the clutch lever 3 to substantially reduce the effort necessary on the part of the operator to overcome the clutch spring. In this manner there will be a distinctly different feel to the brake controlling movement of the clutch lever from that of the movement of the clutch lever which serves only to disengage the clutch. This is particularly desirable in this type of apparatus.

In Figure 5 we have illustrated a motor truck M and a trailer T. The truck, as illustrated, is equipped with our improved fluid pressure actuated brake and clutch control mechanism and we have further provided on the trailer T a fluid pressure cylinder 34 containing a piston to which is secured a piston rod 35 connected to brake operating connections 36 which are adapted to operate the trailer brakes 37. Extending from the end of the cylinder 34 opposite the piston rod 35 is a pipe or conduit 38 which is connected to the suction end of the truck brake actuating cylinder 39.

By means of this connection between the brake operating cylinder 39 of the truck M and the brake operating cylinder 34 of the trailer T, it is possible to simultaneously and uniformly apply the brakes of both the truck and the trailer. When the pressure within the cylinder 39 is reduced the truck brakes will be applied. At the same time the fluid pressure within the head end of the cylinder 34 will be reduced and the trailer brakes 37 will be applied. It will be understood by those skilled in the art that any number of trailers may thus be connected with the main vehicle brake operating cylinder and controlled by the valve which controls the flow of actuating fluid pressure to and from the brake cylinder on the truck or tractor.

It will be seen from the above description that our clutch and brake control mechanism is adapted to greatly facilitate the control of an automotive vehicle and to improve the operation of fluid pressure actuated brake mechanism which is controlled by the vehicle clutch pedal by creating a distinctly different feel between the clutch disengaging portion of the clutch lever stroke and its brake applying portion. Our apparatus also makes it much easier for the vehicle operator to maintain the brakes in applied position for a considerable period of time as it does away with the necessity of constantly overcoming the force of the clutch springs.

Although we have described in considerable detail the form of our invention illustrated in the accompanying drawings, it will be understood by those skilled in the art that modifications and variations may be made in the specific type of apparatus employed. Furthermore, the apparatus may be installed on the motor vehicle in a manner other than that illustrated without departing from the spirit of our invention and we do not, therefore, limit ourselves to the precise details shown and described, but claim as our invention all embodiments thereof coming within the scope of the appended claims.

We claim:

1. In combination in an automotive vehicle, a brake, a clutch, a brake operating lever, a clutch operating lever, fluid pressure actuated means for operating said vehicle brake, means controlled by movement of said vehicle clutch operating lever for controlling said fluid pressure actuated vehicle brake operating means, and fluid pressure actuated means, effective only when the vehicle clutch is disengaged and the vehicle brakes are being applied, for exerting a force tending to maintain said vehicle clutch disengaged.

2. In an automotive vehicle having a clutch and a brake, fluid pressure actuated means for operating said brake, fluid pressure actuated means tending to exert a clutch disengaging force on the vehicle clutch, a source of supply of actuating fluid pressure, valve means adapted to control the connection of both of said fluid pressure actuated means to said source of supply of fluid pressure, and a second valve means adapted to automatically shut off said source of actuating fluid pressure from said clutch operating fluid pressure means when predetermined pressure conditions are established in said clutch operating fluid pressure means and independently of said first namde valve means.

3. In apparatus of the type described a fluid pressure cylinder, a piston, and operating connections from said piston adapted to actuate the brakes of a motor vehicle; a second fluid pressure cylinder, piston and connecting means adapted to exert a disengaging force on the vehicle clutch mechanism; valve means for controlling the flow of actuating fluid pressure to and from said first named cylinder; fluid pressure connections between said first named cylinder and said second named cylinder; and valve means, adapted to be operated by the fluid pressure in said first named cylinder, for controlling the flow of actuating fluid pressure to and from said second named cylinder.

4. In an automotive vehicle, a clutch, a clutch operating lever, fluid pressure actuated means for applying a disengaging force on said clutch, a control valve for said fluid pressure actuated means adapted to be actuated by movement of said clutch operating lever, and fluid pressure actuated means, responsive to the fluid pressure applied to said clutch disengaging means by said control valve, for closing the actuating fluid pressure connection to said clutch disengaging means when a predetermined clutch disengaging force has been exerted thereby.

5. In a fluid pressure actuated device having a cylinder and piston adapted to exert a disengaging force on the clutch of an automotive vehicle, a valve adapted to control the connection of said cylinder to a source of actuating fluid pressure, and a second valve, responsive to fluid pressure within said cylinder, adapted to close the connection between the cylinder and the source of pressure when a predetermined fluid pressure obtains within said cylinder.

6. In a fluid pressure actuated device having a cylinder and piston adapted to exert a disengaging force on the clutch of an automotive vehicle, a valve adapted to control the connection of said cylinder to a source of actuating fluid pressure, a second valve, responsive to fluid pressure within said cylinder, adapted to close the connection between the cylinder and the source of pressure when a predetermined fluid pressure obtains within said cylinder, and adjustable means for controlling the closing of said second valve whereby said second valve may be set to close when the desired pressure obtains within said cylinder.

FREDERICK G. FOLBERTH.
WILLIAM M. FOLBERTH.